United States Patent
Schöppe

[11] Patent Number: 5,701,198
[45] Date of Patent: Dec. 23, 1997

[54] CONFOCAL INCIDENT LIGHT MICROSCOPE

[75] Inventor: Günter Schöppe, Jena, Germany

[73] Assignee: Carl Zeiss JENA GmbH, Jena, Germany

[21] Appl. No.: 625,831

[22] Filed: Apr. 1, 1996

[30] Foreign Application Priority Data

Mar. 31, 1995 [DE] Germany .................. 195 11 937.1

[51] Int. Cl.$^6$ .............................. G02B 21/06; G02B 5/04
[52] U.S. Cl. ..................... 359/386; 359/368; 359/371; 359/831
[58] Field of Search ..................... 359/368, 227, 359/385–389, 234–236, 494–496, 831, 832, 837, 370–371

[56] References Cited

U.S. PATENT DOCUMENTS

| | | | |
|---|---|---|---|
| 3,926,500 | 12/1975 | Frosch et al. | 359/235 |
| 4,806,004 | 2/1989 | Wayland | 359/389 |
| 4,850,686 | 7/1989 | Morimoto et al. | 359/837 |
| 4,884,880 | 12/1989 | Lichtman et al. | 359/227 |
| 4,927,254 | 5/1990 | Kino et al. | 359/235 |
| 4,964,707 | 10/1990 | Hayashi | 359/371 |
| 5,004,321 | 4/1991 | Feldman et al. | 359/368 |
| 5,022,743 | 6/1991 | Kino et al. | 359/235 |
| 5,067,805 | 11/1991 | Corle et al. | 359/235 |
| 5,153,775 | 10/1992 | Itami et al. | 359/837 |
| 5,162,941 | 11/1992 | Favro et al. | 359/235 |
| 5,287,219 | 2/1994 | Hildebrand et al. | 359/368 |

FOREIGN PATENT DOCUMENTS 3826317 7/1989 Germany.

*Primary Examiner*—Thong Nguyen
*Attorney, Agent, or Firm*—Walter Ottesen

[57] ABSTRACT

The invention is directed to a confocal incident light microscope for viewing an object. The microscope includes: an illuminating device for transmitting an illuminating beam along an illuminating beam path; a viewing optical assembly for defining a viewing beam path; an optical unit for joining the illuminating beam path and the viewing beam path to form a common beam path; a perforated mask arranged in the common beam path at an angle $\delta$ to a plane perpendicular to the common beam path; an imaging optic arranged between the perforated mask and the object; a first prism having a first wedge-shaped section arranged in the common beam path between the optical unit and the perforated mask; the first wedge-shaped section defining a wedge angle $\alpha$ and having a surface essentially parallel to the perforated mask; a second prism having a second wedge-shaped section arranged in the common beam path between the perforated mask and the imaging optic; the second wedge-shaped section defining a wedge angle corresponding to the wedge angle $\alpha$ and having a surface essentially parallel to the perforated mask; the first and second prisms being arranged in the common beam path so as to be rotated by 180° relative to each other; and, the first and second prisms defining the wedge angle $\alpha$:

$$\alpha = \delta \times n/(n-1)$$

wherein: $n$ = index of refraction of the wedge-shaped section.

6 Claims, 2 Drawing Sheets

CONFOCAL INCIDENT LIGHT MICROSCOPE

FIELD OF THE INVENTION

The invention relates to reducing disturbing light in confocal direct-view microscopes. The disturbing light comes, for example, from the optical elements of the microscope because of reflections and/or scattering. Microscopes of this kind permit the real time investigation of very thin object layers with a contrast which is improved compared to conventional microscopes and with a significant reduction of disturbing influences of object layers lying outside of the focal plane of the objective (optical cutting).

BACKGROUND OF THE INVENTION

With microscopes of this kind, light points are imaged in specific patterns in the object plane in different ways and the object and light points are projected in common onto a perforated mask. The perforated mask contains apertures in the same pattern as the pattern in the object plane. The effect of this arrangement has been known in microscopy for some time as the Schwarzschild-Villinger effect.

In order to allow not only individual object points to become visible, the pattern and object are moved relative to each other and the arrangement is so configured that the image to be viewed is at rest relative to the receiver (eye, camera).

A technically very advantageous possibility to image the illumination pattern and the viewing pattern exactly one into the other is the use of the same mask for viewing and illumination. In this connection, reference can be made to U.S. Pat. Nos. 3,926,500; 4,806,004; 4,884,880; 4,927,254; and 5,022,743. Each aperture of the pattern is imaged via the object into itself when the object is focused.

All these arrangements have the difficulty that the illuminating light, which is reflected from the full surface of the mask, has approximately the same brightness, even with extremely low degrees of reflection of the perforated mask material, as the useful light reflected back from the object. This difficulty defeats the desired effect. For this reason, various possibilities for dealing with the disturbing light are given and utilized.

U.S. Pat. Nos. 3,926,500; 4,927,254; and 5,022,743 disclose dark layers which can reflect directly as well as in a diffuse manner. The degree of reflection of 0.01% and less, which is necessary for the effective suppression of disturbing light, cannot be attained practically. For this reason, individual or combined additional means for suppressing disturbing light are utilized.

An often used method is a method for suppressing disturbing light described in the 1920s by August Köhler. This method operates with polarization-optical means. A polarizer and an analyzer are crossed in this method. If illuminating light is reflected at one location of the illuminating beam path, then the illuminating light cannot pass the analyzer. A λ/4-plate is mounted in the beam path closely forward of the objective. This λ/4-plate is passed through in the forward direction as well as in the return direction. The polarization plane is rotated by 90° and the light returning from the object can then pass the polarizer. This method is also described in U.S. Pat. Nos. 3,926,500; 4,927,254; and 5,022,743 referred to above. The method however has the disadvantage that it limits available investigating possibilities for double refracting objects and has a reduced efficiency when compared to other possible methods when polarizers are to be used which can be manufactured at a reasonable cost. Furthermore, the method requires polarization optical components free of defects in the beam path between polarizer and analyzer.

Another method is disclosed in U.S. Pat. Nos. 3,926,500 and 5,067,805. In this method, the perforated mask is so inclined in the beam path that the reflections are directed in a direction outside the used beam space. The pattern is then likewise imaged in a plane inclined to the optical axis. This inclined position changes with the objective magnification and, furthermore, the imaging scale varies over the field of view. Both are disadvantageous for use in technical areas.

Another arrangement is also described in U.S. Pat. Nos. 4,927,254 and 5,022,743 and includes a diaphragm positioned centrally in the beam path. The diaphragm lies in a narrow constriction (pupillary image). Diaphragms of this kind disadvantageously change the image character especially for average object structures (reduction of contrast of mean spatial frequencies).

German Patent 3,826,317 discloses electronic means to make disturbing light ineffective (threshold value switches, forming optical difference images). These methods permit only the contrast display of the object to be investigated on a monitor.

SUMMARY OF THE INVENTION

It is an object of the invention to provide an arrangement which substantially eliminates the above-mentioned disadvantages.

The object of the invention is realized in that a perforated mask having a low degree of reflection is inclined at an angle $\delta$ with respect to a plane perpendicular to the optical axis. The mask preferably reflects the radiation in a directed manner and is arranged in the beam path between the wedges or prisms having a wedge angle $\alpha = \delta \times n/(n-1)$ wherein (n) is the index of refraction of the wedges. The wedges or prisms are directed so as to be mutually opposing and the respective sides of the wedges or prisms facing the mask are orientated essentially parallel to the mask.

The mask appears tilted by the angle $\delta$ in the region of the wedges or prisms because of refraction so that the mask appears to lie in a plane essentially perpendicular to the optical axis.

In this way, the above-described disadvantages associated with the inclined position of the disc are solved because the imaging scale in the now erected image is constant over the viewing field and no unwanted color shift occurs. The angle must be $\alpha - \delta > \sigma$ so that the reflections from the outer faces of the wedges or prisms are reflected into a region lying outside of the used beam path. The angle $\sigma$ is the aperture angle of the optic imaging the perforated mask onto the image side. The aperture angle is defined as that angle conjointly defined by an object or image ray through the edge of the aperture stop of an optical system (here the imaging optic comprising the objective and the tube lens) and the optical axis.

This arrangement permits without limitation the use of all investigating methods conventional for incident-light microscopy in combination with confocal imaging without disturbing light from the perforated mask.

With conventional glasses ($n \geq 1.5$) and a wedge angle $\alpha = \delta \times n/(n-1)$, an incident light beam parallel to the axis is reflected at the surfaces facing toward the perforated mask and at the outer surfaces of the perforated mask at an angle $\rho > 2\sigma$ so that reflections from these surfaces are directed into the space outside of the aperture range of the optic. The same applies to the reflections from the outer-lying surfaces of the wedges or prisms.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
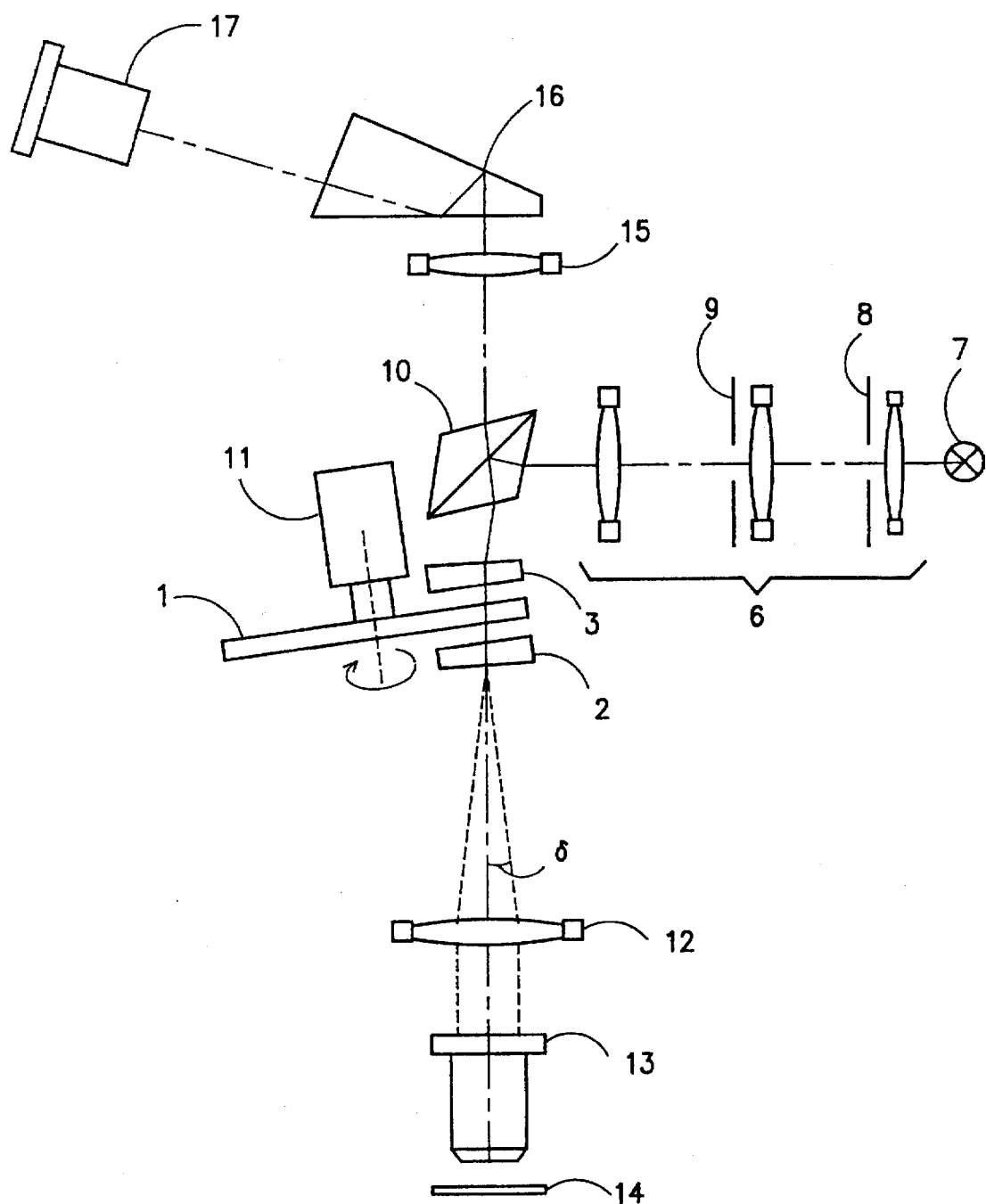
FIG. 1 is a schematic showing the entire arrangement of a confocal direct view microscope according to the invention; and, FIG. 2 shows an arrangement of the invention supplemented by the trace of the reflected rays.

FIG. 1 shows an illuminating optic 6 comprising a light source 7, a field stop 8 and an aperture stop 9. The illuminating beam is guided via a beam splitter 10 in the direction of a perforated mask 1 such that an image of the field stop 8 is formed on the upper side of the perforated mask 1. The perforated mask is mounted so as to be inclined in the beam path and is configured in the manner of a Nipkow disc. The perforated mask and field stop 8 are imaged by a tube lens 12 and an objective 13 into the plane of an object 14 being viewed. The object, in turn, is return imaged on the perforated mask (confocal imaging).

The perforated mask 1 is displaced in a rotational movement by a motor 11 so that the aperture pattern thereon moves over the object plane. The returning beams pass again through the apertures of the perforated mask and pass through the beam splitter 10. The plane of the perforated mask is imaged with the image of the object 14 via a lens 15 and a Bauernfeind prism 16 into an ocular 17.

The elements between the perforated mask 1 and the ocular 17 are purposefully so dimensioned with respect to their diameter that the light returning from the object 14 can pass the light path without cropping. However, the rays reflected by the prisms (wedges 2 and 3) mounted forward and rearward of the perforated mask as well as the rays reflected by the inclined mask 1 itself and by the outer surfaces of the beam splitter 10 (which is preferably rhombically configured) reach a region outside of the field stop of the ocular 17.

The aperture angle of the viewing end imaging optic is not greater than or only insignificantly greater than the aperture angle of the object-end imaging optic.

Figure 2:
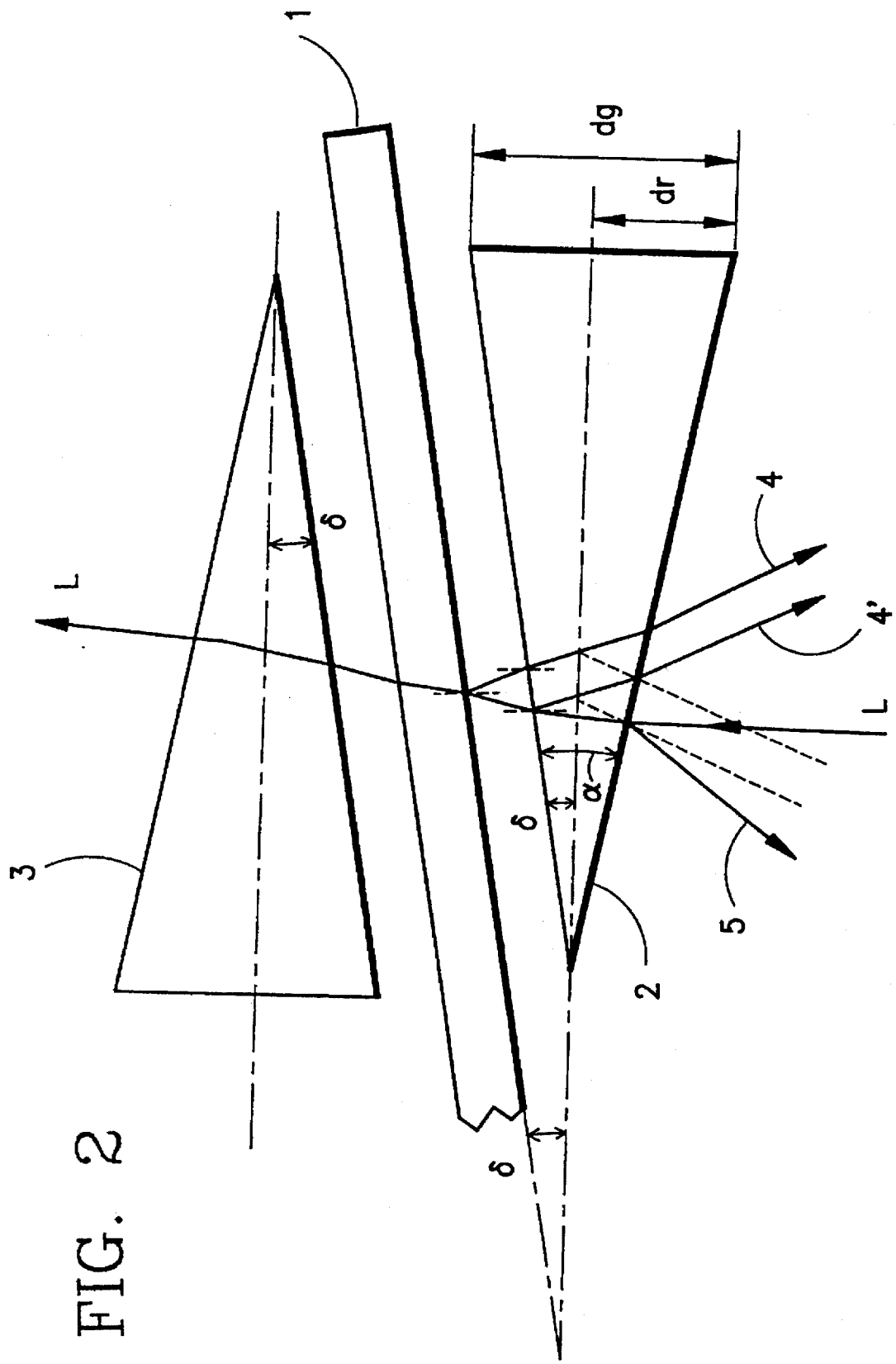

In FIG. 2, the perforated mask 1 of FIG. 1 is inclined at an angle $\delta$ with respect to a plane perpendicular to the optical axis in the beam path between mutually oppositely directed glass wedges 2 and 3 having a wedge angle $\alpha = \delta \times n/(n-1)$. The wedge angle $\alpha$ is here shown greatly exaggerated. The sides of the glass wedges facing toward the perforated mask are orientated essentially parallel to the perforated mask.

The perforated mask thereby appears tilted by diffraction by the angle $-\delta$ in the region of the wedge-shaped prisms so that the mask appears to lie in a plane essentially perpendicular to the optical axis.

The angle must be $\alpha - \delta > \sigma$ so that the reflections from the outer surfaces of the wedges or prisms are reflected into a region outside of the beam path utilized. The angle $\sigma$ is the aperture angle of the optic imaging the perforated mask on the image end and this optic here comprises the objective 13 and the tube lens 12.

The total thickness (dg) of the glass wedge shown is related to the "reduced thickness" (dr) of the glass wedge as the refractive index of the glass to the refractive index of air. For conventional glasses, $(n \geq 1.5)$ and a wedge angle $\alpha = \delta \times n/(n-1)$, an axially parallel incident light beam L is reflected at the surfaces of the wedges facing toward the perforated mask and at the outer surfaces of these wedges at an angle $\rho > 2\delta$ so that reflections from these surfaces are directed into a space outside of the aperture region of the optic. The same happens with the reflection from the outside lying surfaces of the glass wedges. The glass wedge 3 can also have an orientation which departs from the parallel with respect to the perforated mask 1 and the side of the glass wedge 3 facing toward the mask 1.

In FIG. 2, the ray 4' for example, defines the trace of a ray reflected from the surface of the glass wedge 2 which faces toward the perforated mask. The ray trace of the ray 4 reflected by the perforated mask 1 corresponds to the trace of the ray 4'. The beam paths shown in FIG. 2 apply to the radiation coming from the object being viewed and to the illuminating radiation because of the arrangement of the glass wedges with their mutually oppositely directed orientation. All disturbing light reflections are substantially avoided. Ray 5 is reflected by the outer side of the glass wedge. Here too, a reflection into a region lying outside of the beam path used is provided.

The invention is not tied to the embodiment shown but rather can be advantageously used in all arrangements utilizing a perforated mask in the manner of a Nipkow disc.

It is understood that the foregoing description is that of the preferred embodiments of the invention and that various changes and modifications may be made thereto without departing from the spirit and scope of the invention as defined in the appended claims.

What is claimed is:

1. A confocal incident light microscope for viewing an object, the confocal incident light microscope comprising:

an illuminating device for transmitting an illuminating beam along an illuminating beam path;

a viewing optical assembly for defining a viewing beam path;

an optical unit for joining said illuminating beam path and said viewing beam path to form a common beam path;

a perforated mask arranged in said common beam path at an angle $\delta$ to a plane perpendicular to said common beam path;

an imaging optic arranged between said perforated mask and said object;

a first prism having a first wedge-shaped section arranged in said common beam path between said optical unit and said perforated mask;

said first wedge-shaped section defining a wedge angle $\alpha$ and having a surface essentially parallel to said perforated mask;

a second prism having a second wedge-shaped section arranged in said common beam path between said perforated mask and said imaging optic;

said second wedge-shaped section defining a wedge angle corresponding to said wedge angle α and having a surface essentially parallel to said perforated mask;

said first and second prisms being arranged in said common beam path so as to be rotated by 180° relative to each other; and, said first and second prisms defining said wedge angle α:

$$\alpha = \delta \times n/(n-1)$$

wherein: n=index of refraction of said wedge-shaped section.

2. The confocal incident light microscope of claim 1, wherein said perforated mask is a Nipkow disc.

3. The confocal incident light microscope of claim 2, wherein said first and second prisms are glass wedges.

4. A confocal incident light microscope for viewing an object, the confocal incident light microscope comprising:

an illuminating device for transmitting an illuminating beam along an illuminating beam path;

a viewing optical assembly for defining a viewing beam path;

an optical unit for joining said illuminating beam path and said viewing beam path to form a common beam path;

a perforated mask arranged in said common beam path at an angle δ to a plane perpendicular to said common beam path;

an imaging optic arranged between said perforated mask and said object and having an aperture angle σ;

a first prism having a first wedge-shaped section arranged in said common beam path between said optical unit and said perforated mask;

said first wedge-shaped section defining a wedge angle α and having a first surface adjacent to said perforated mask;

a second prism having a second wedge-shaped section arranged in said common beam path between said perforated mask and said imaging optic;

said second wedge-shaped section defining a wedge angle corresponding to said wedge angle α and having a second surface adjacent to said perforated mask;

said first and second surfaces being essentially parallel to each other;

said first and second prisms being arranged in said common beam path so as to be rotated by 180° relative to each other; and, said wedge angle α being greater than the sum of said angle δ and said angle σ to eliminate disturbing light reflections.

5. The confocal incident light microscope of claim 4, wherein said perforated mask is a Nipkow disc.

6. The confocal incident light microscope of claim 5, wherein said first and second prisms are glass wedges.

* * * * *